United States Patent [19]
Yoshino et al.

[11] Patent Number: 5,841,503
[45] Date of Patent: Nov. 24, 1998

[54] HIGH MOLECULAR LIQUID CRYSTAL DEVICE AND METHOD OF MANUFACTURING THE SAME

[75] Inventors: Katsumi Yoshino, Osaka-fu, Japan; Kent Skarp, Lindome, Sweden

[73] Assignee: Mitsui Chemicals, Inc., Tokyo, Japan

[21] Appl. No.: 646,309

[22] Filed: May 14, 1996

[30] Foreign Application Priority Data

Sep. 28, 1994 [JP] Japan .................................. 6-232696

[51] Int. Cl.$^6$ ............................ G02F 1/1333; G02F 1/13
[52] U.S. Cl. ........................ 349/158; 349/182; 349/183; 349/184; 349/186; 349/172
[58] Field of Search ............................ 349/158, 182–186, 349/172

[56] References Cited

U.S. PATENT DOCUMENTS

| | | | |
|---|---|---|---|
| 4,615,962 | 10/1986 | Garito . | |
| 5,438,421 | 8/1995 | Sugawara et al. | 359/75 |
| 5,526,150 | 6/1996 | Mazaki et al. | 359/73 |
| 5,568,287 | 10/1996 | Shingaki et al. | 359/53 |

FOREIGN PATENT DOCUMENTS

| | | |
|---|---|---|
| 0542028 | 5/1993 | European Pat. Off. . |
| 62-237425 | 10/1987 | Japan . |
| 10-90413 | 4/1989 | Japan . |
| 1-319733 | 12/1989 | Japan . |
| 2-247617 | 10/1990 | Japan . |
| 4-16915 | 1/1992 | Japan . |
| 4-57015 | 2/1992 | Japan . |
| 4-63830 | 2/1992 | Japan . |
| 4-320218 | 11/1992 | Japan . |
| 5-246725 | 9/1993 | Japan . |
| 5-310840 | 11/1993 | Japan . |
| 60-16616 | 1/1994 | Japan . |
| 6-72905 | 3/1994 | Japan . |

OTHER PUBLICATIONS

Kent Skarp et al., "Electrooptical and Nonlinear Optial Effects in Free–Surface Films of Polymeric Ferroelectric Liquid Crystals Prepared by Spi–Coating Method," *Jpn. J. Appl. Phys.*, Vol. 34 (1995) pp. 5433–5437, Part I, 9B Sep. 1995.

Kent Skarp et al., "Electro–optic Effects in Polymeric Ferroelectric and Antiferroelectric Liquid Crystals Thin Films Prepared by Spin–Coating Method," *Denki Zairyo Gijutsu Zatsushi*, vol. 3, No. 1, 1994, pp. 70–73.

"Liquid Crystal Device Handbook", The Japan Society of the Promotion of Science, No. 142 Committee, Nikkan Kogyo Newspaper Publishing Company, Sep. 29, 1989, pp. 358–363 (reference and abstract).

*Primary Examiner*—William L. Sikes
*Assistant Examiner*—Julie Ngo
*Attorney, Agent, or Firm*—Burns, Doane, Swecker & Mathis, L.L.P.

[57] ABSTRACT

This invention is a method of manufacturing liquid crystal device, wherein a high molecular liquid crystal layer of the device is formed by applying a high moleculer liquid crystal solution to form an active layer on the substrate and evaporating the solvent, and as high molecule liquid crystal, for example, high molecular liquid crystal having a structure formula as following is utilized.

32 Claims, 8 Drawing Sheets

HIGH MOLECULAR LIQUID CRYSTAL DEVICE AND METHOD OF MANUFACTURING THE SAME

TECHNICAL FIELD

This invention relates to a liquid crystal device which comprises a liquid crystal, especially a high molecular liquid crystal consisting of single or multiple layers of a high molecular liquid crystal which functions as an active layer, and a new method for manufacturing the same.

BACKGROUND OF THE INVENTION

In a liquid crystal device, especially, one which forms a display device or is used as various kinds of optical devices or optical wave guiding devices, it is indispensable to form liquid crystal membranes with well aligned layers between a pair of electrodes.

In order to form these liquid crystal membranes with well aligned layers, a conventional method comprises forming one pair of transparent electrodes, for example, consisting of indium-tin oxide coatings on surfaces of one pair of sheets made of, e.g., glass or quartz respectively, applying polymer materials having the function of allowing liquid crystal molecules which will be supplied later to align on the surface thereof, treating appropriately, and then attracting the liquid crystal into a gap by utilizing capillary action.

This method is practically and widely applied in the manufacturing of low molecular weight liquid crystal devices. However, there is a problem that this method needs an inactive polymer to be applied on a substrate prior to the treatment mentioned above and furthermore is complicated in process and difficult to fill the liquid crystal by capillary action because of its higher viscosity of the high molecular liquid crystal in comparison with the low molecular weight liquid crystal, and well-aligned layers can not be obtained unless shear or flow is utilized.

Because material to form a polymer coat may be varied depending on the kind of liquid crystals and alignment conditions used, the material must be developed newly every time the liquid crystal material and orientation conditions are changed. However, the material adapted to this polymer coat has not been obtained in the case of high molecular liquid crystal.

Moreover, in said prior art, appropriate conductive coating material must be selected and applied in order to form transparent electrodes on the substrate according to the required orientation condition and kind of liquid crystal.

Furthermore, there has been a problem that cost is increased and the liquid crystal device can not be supplied in large quantities and at low prices using this method, because this method itself needs complicated and multistage processes and a great deal of handling and time-consuming equipment in manufacturing the device because this method itself comprises steps of coating with transparent electrode material or the like on the surface of the substrate, and then, applying inactive polymeric material thereon, and treating by rubbing and so on.

An object of the present invention is to provide a method for manufacturing a high molecular liquid crystal device directly on the substrate surface by forming a high molecular liquid crystal layer which can function as an active layer without requiring those inactive polymeric material coatings, independent of any chemical and physical condition of the surface of the substrate, thereby allowing to be manufactured simply as a liquid crystal layer of high quality at a low price and a high molecular liquid crystal device manufactured by said method.

DISCLOSURE OF THE INVENTION

This invention relates to a method of manufacturing a high molecular liquid crystal device, wherein a high molecular liquid crystal layer which functions as an active layer is formed by applying uniformly a high molecular liquid crystal solution directly on the substrate, the solution being obtained by dissolving a high molecular liquid crystal which functions as an active layer in an appropriate solvent directly and evaporating the solvent, and further relates to a high molecular liquid crystal device manufactured by such a method.

Any high molecular liquid crystal which is capable of being dissolved in an appropriate solvent and which can form an active layer provided with function may be utilized without any special restriction. For example, a high molecular liquid crystal having the following formula (1) may be used.

(1)

$-5°$ C. $S_C^* + 110°$ C. $S_A$ $130°$ C. I

More particularly, the high molecular liquid crystal layer mentioned above can be obtained by a method comprising dissolving 1.5 g of the high molecular liquid crystal in 10 ml of chloroform, cleaning and then dropping the solution over a dried glass substrate and spincoating for 5 sec at 300 rpm of rotational frequency, initially, and then 3,000 rpm for 25 sec.

In this way, a high molecular liquid crystal membrane of 2.7 $\mu$m of thickness is obtained. Results from observation with a polarizing microscope has confirmed that a good homeotropic orientation membrane was obtained.

Moreover, it was confirmed that a phase transition from an isotropic solution to a smectic A phase occurs at 130° C., to a chiral smetic C phase (ferroelectric phase) at 110° C., and this phase was maintained to $-5°$ C., when the observation was carried out while decreasing temperature.

When an appropriate solvent which can dissolve a high molecular liquid crystal is found, this method becomes applicable to any high molecular liquid crystal. A well-oriented high molecular liquid crystal layer can be obtained, when the solvent is evaporated while forming a layer or a membrane of the high molecular liquid crystal solution.

Especially, in order to realize a well-aligned orientation, a method for forming a layer comprising applying high molecular liquid crystal while allowing a flow of the high molecular liquid crystal solution on the substrate to regulate in one direction, for example, spin-coating method or down-flow method or the like are recommended. Moreover, it is possible to form a desired liquid crystal pattern on the substrate by screen-printing or the like.

The useful concentration of high molecular liquid crystal in the solution depends on the characteristics of the liquid crystal, objects for use of the device and the desired thickness of the liquid crystal layer etc. However, the concentration is not limited within a specific concentration range, and also, the high molecular liquid crystal membrane including dopant molecules or appropriate particles or the like can be obtained by dissolving or mixing other materials, apart from the liquid crystal, in the solution simultaneously.

The invention can be also applied to any kind of liquid crystal regardless of the kind of high molecular liquid crystal, for example, to a side chain type high molecular liquid crystal, a main chain type high molecular liquid crystal, a chiral smectic liquid crystal, a nematic liquid crystal, a cholesteric liquid crystal, a ferroelectric liquid crystal, an antiferroelectric liquid crystal and a ferri-electric liquid crystal, or the like.

It is possible to regulate the orientation of liquid crystal molecules by appropriately controlling manufacturing conditions depending on the kind of liquid crystal. For example, in the case of spin-coating method, it becomes possible to regulate the orientation of the membrane by the number of revolutions. For example, in the case of spin-coating of a side chain type high molecular liquid crystal, because generally side chain mesogen of liquid crystal molecules becomes perpendicular to the substrate, it is also possible to make it a homeotropic orientation or other orientation by number of revolution as well as to make it homogeneous orientation such that polymer main chains become parallel to the surface of the substrate.

When making the device into an electro-optical effect device to utilize electro-optical effects as function, there are not only a ferroelectric switch resulting in an optical characteristic change, for example, a change in birefringence or a change in the strain of helical structure as electro-optical effect to utilize, but, moreover, it is possible to make the soft mode devices of the type using the electroclinic effect; electro-optical effect devices comprising a transient scattering mode (TSM), a twisted-nematic mode (TNM) and a super twisted-nematic mode (STNM) or the like; and electro-optical effect devices of the type which utilize phase shift.

Moreover, in view of the characteristics, it is possible to utilize the device which is an optical wave guide type device, a non-linear optical device, a pyro-electric effect device and a piezo-electric effect device, and the liquid crystal layer may be composed of not only single layer but multi layers of high molecular liquid crystal.

Moreover, there is no restriction in the thickness of the liquid crystal layer, but it is recommended to choose usually 0.5 µm or more and less than 1000 µm, preferably between 2 µm and 10 µm, except in cases of a special use.

There is no special limitation in substrate material, but glass and quartz or the like is usually recommended as substrate, and a semiconductor substrate such as silicon wafer can be also used. Substrate material can be selected at will depending on kind and function of the high molecular liquid crystal.

Moreover, after forming a membrane consisting of other material for a surface treatment, for example, electrode material, other liquid crystal, protective layer material or the like, or making up an integrated circuit, on the surface of the substrate, the high molecular liquid crystal layer can obviously be formed as a material on the surface. Furthermore it is possible to use, for example, a plate provided with a transparent electrode layer consisting of ITO (Indium-Tin Oxide) or the like or an appropriate electrode pattern with the ITO and a metal membrane of gold, aluminium, copper or the like formed by evaporation or sputtering and furthermore every kind of semiconductor device, for example, a thin film transistor (TFT) of amorphous silicon, on the surface of the substrate as the substrate.

Accordingly, in the descriptions of the specification and claims, the substrate includes all of these which are described above, that is, all of plates, boards, bars, membranes, electrodes and material or all of parts on which a high molecular liquid crystal layer is to be formed.

High molecular liquid crystal aligned membrane formed according to the present invention can be actuated by applying voltage between the electrodes formed on the substrate, and in this case a second substrate comprising a glass plate, a plastics plate, a quartz plate or the like may be provided for the object of protection and stabilization or the like at the upper surface of the high molecular liquid crystal membrane.

Moreover, disposing a counter plate having electrodes formed into a desired shape on the surface of this substrate formed with the high molecular liquid crystal membrane, and then, the liquid crystal may be actuated by applying voltage between the electrode on the substrate and the electrode on the counter plate.

In case of utilizing the high molecular liquid crystal device as an optical device, while light is usually impinges perpendicular to, or with a suitable angle, upon the substrate and in many cases, intensity changes of transmitted or reflected light is utilized as an output. It is also possible to utilize the device as a so called optical wave guide which transmits light in a direction parallel with the high molecular liquid crystal membrane formed on the substrate.

Furthermore, a liquid crystal device which operates as a phase diffraction grating can be obtained resulting in changes of the angle of diffraction according to the electroclinic effect when the high molecular liquid crystal layer is formed on the substrate formed with a lot of pairs of parallel electrodes which are aligned with a space determined according to the wavelength of incident light.

This is obtained by utilizing change in birefringence in a smectic A phase, thereby the orientation of light can be controlled.

Furthermore, the high molecular liquid crystal device according to the present invention includes a device called multi layer high molecular liquid crystal device consisting of every kind of high molecular liquid crystal membrane, a conductive high molecular membrane, insulation high molecular layer or the like, which are laminated alternately, as well as a single high molecular liquid crystal layer.

And then, all liquid crystal devices as mentioned above are able to be utilized for pixels of a display and control of light.

BEST MODE FOR CARRYING OUT THE INVENTION

The invention will be described in detail according to the drawings as follows, but the invention will be not limited by these embodiments as a material, of course.

[EXAMPLE 1]

Figure 1:
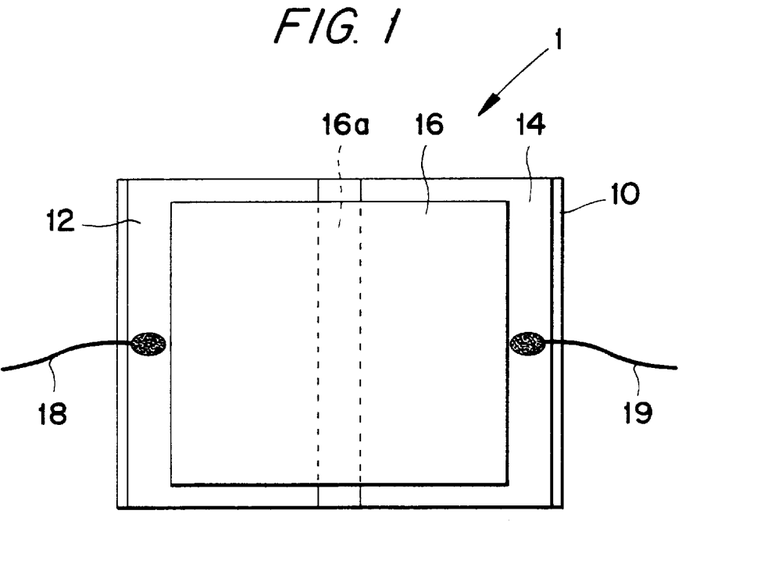
FIG. 1 is a plan view showing configuration of the first embodiment of a single layer high molecular liquid crystal device according to the invention.
Figure 2:
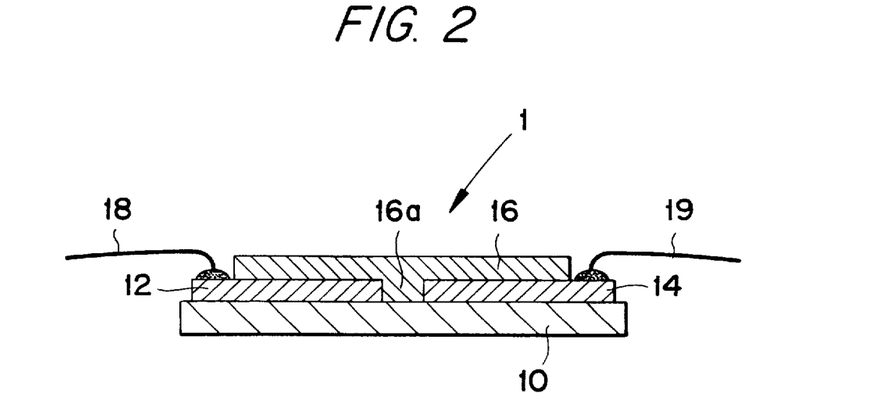
FIG. 2 is a transverse center-sectional view of the device.

In FIGS. 1 and 2, 1 is a high molecular liquid crystal device of single layer type, 10 is its glass substrate, 12, 14 are a pair of transparent electrode layers consisting of indium-tin oxide, 16 is the high molecular liquid crystal layer, 16a is its activated part, and 18 and 19 are the terminals connected to the transparent electrode layers 12 and 14 respectively.

This high molecular liquid crystal layer is applied directly without special polymer coats on the transparent electrode layers 12, 14, and functions as an active layer.

This high molecular liquid crystal device 1 is manufactured as follows;

first, forming a transparent electrode layer consisting of Indium-Tin Oxide on a glass substrate of length 40 mm and transverse width 55 mm, and then, removing central portion thereof 0.5 mm in width by etching to form a pair of transparent electrodes layer 12, 14 by dividing into two parts, forming a high molecular liquid crystal layer 16 as mentioned above on the upper surface, and finally forming terminals 18, 19.

However, spin-coating at 300 rpm for 6 sec initially, and then at 3,000 rpm for 24 sec was used.

Observations of the relation between applied voltage and transmission intensity of light in the activated part 16a were carried out by applying voltage to the terminals 18 and 19 which were connected to a power supply and impinging light of a He-Ne laser of 6,328 Å in wavelength perpendicular onto the high molecular liquid crystal layer.

Figure 3:
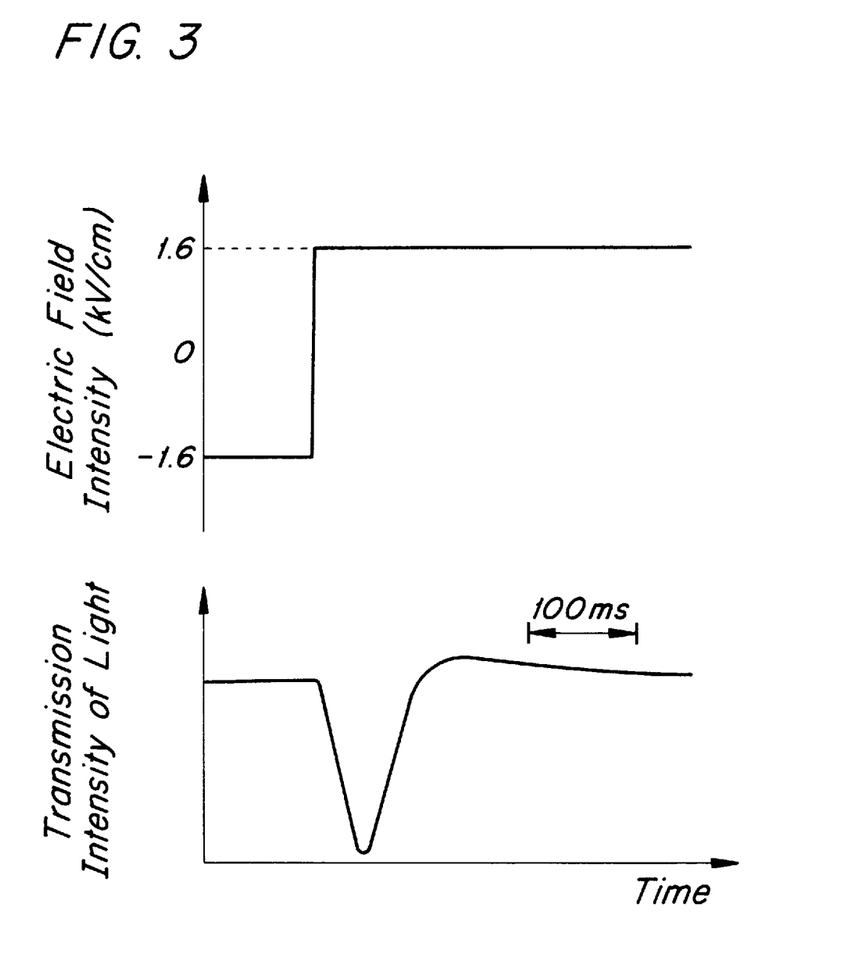
FIG. 3 is a graph showing a relative relationship between a change of electric field intensity and change of transmission intensity of light in the device of first embodiment shown in FIGS. 1 and 2.
Figure 4:
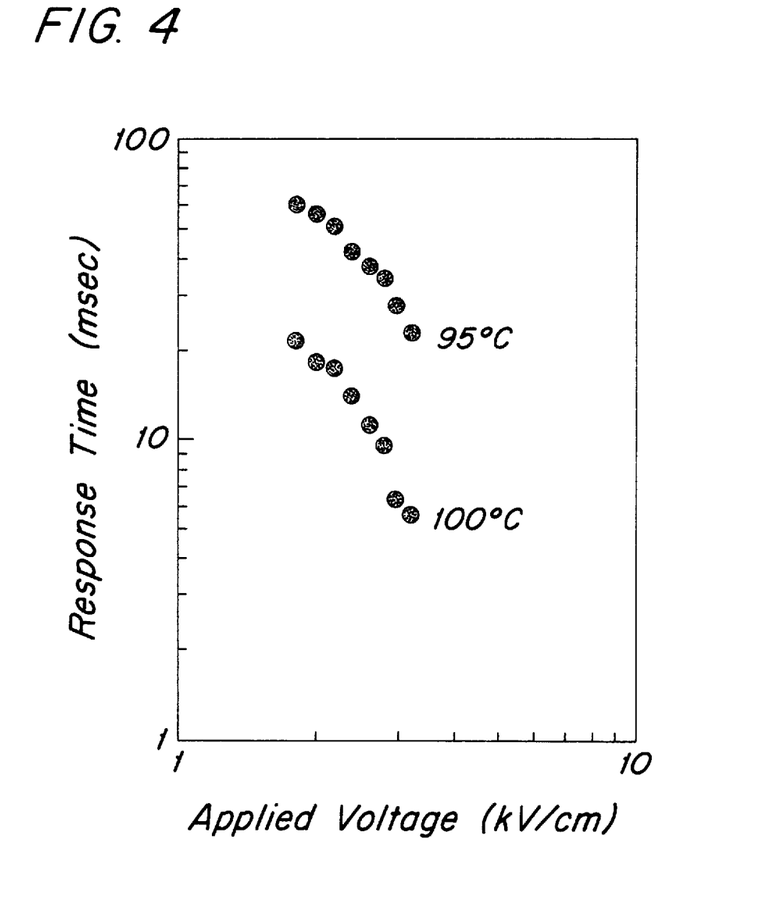
FIG. 4 is a graph showing relationship between temperature and applied voltage/response time characteristic.

As shown in FIG. 4, it is confirmed a decrease in transmitted light like a pulse at temperatures below 110° C. associated with inverting electric polarity in a step like manner as shown in FIG. 3. This is a characteristic of transient scattering mode (TSM) electro-optical effect device.

Moreover, response time thereof became shorter with increasing electrical field.

Figure 5:
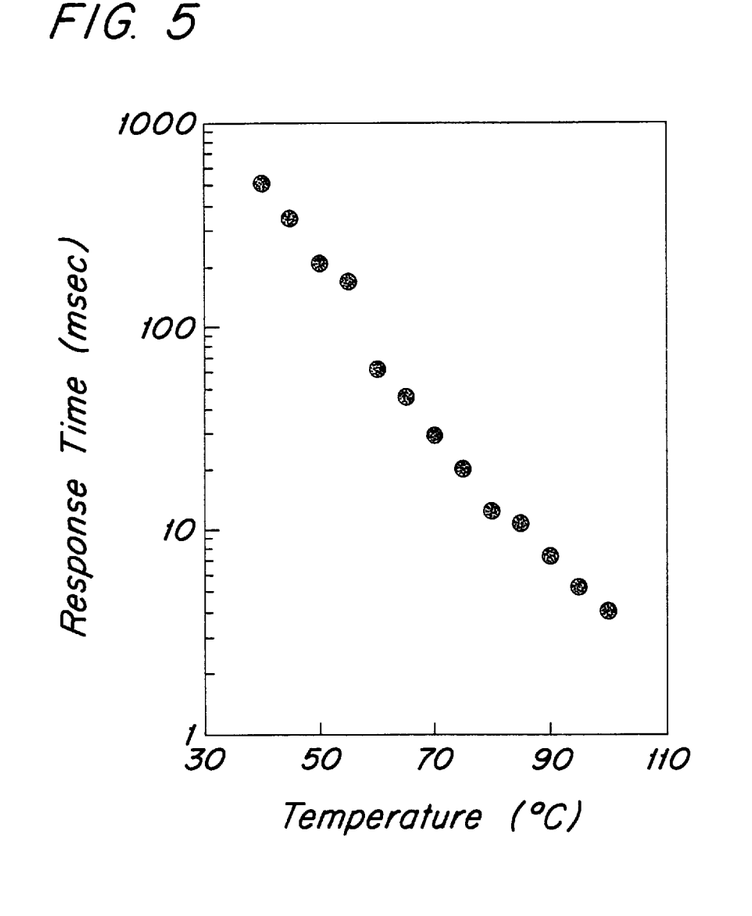
FIG. 5 is a graph showing temperature characteristic of response time.
Figure 6:
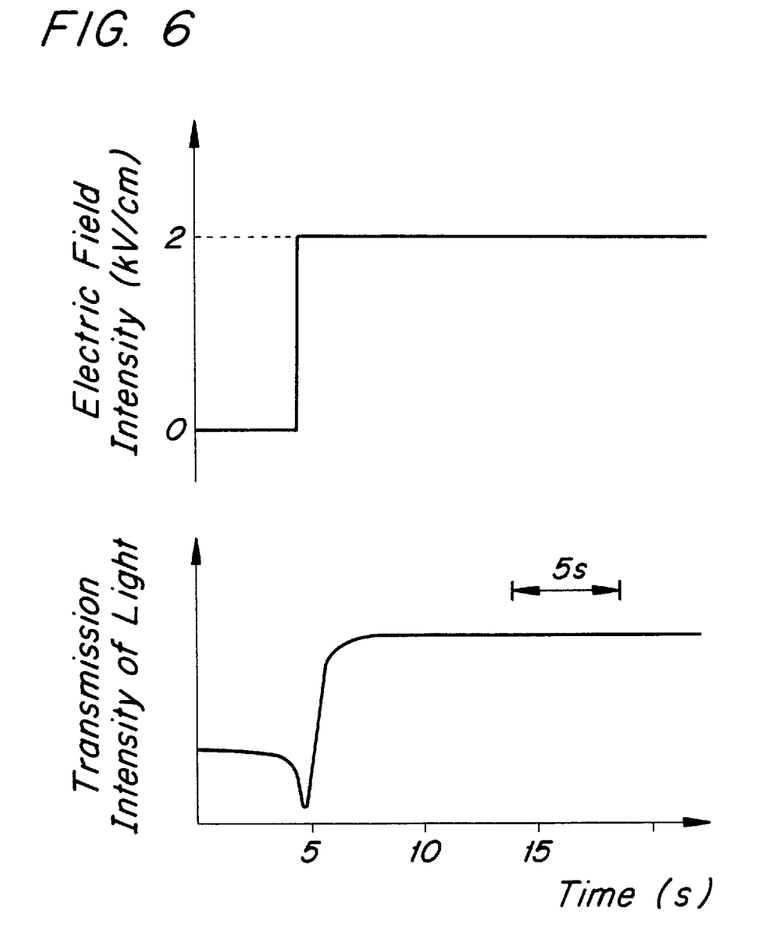
FIG. 6 is a graph showing the relative relationship between a change of electric field intensity and change of transmission intensity of light in the device of the second embodiment different from mentioned above.

As shown in FIGS. 5 and 6, it was known that the response time became longer in a ferroelectric phase with decreasing temperature.

[EXAMPLE 2]

When a step voltage was applied to a device manufactured in the identical condition of the Example 1 at 100° C. as shown in FIG. 6, it was known that transmission intensity of light was increased.

This is a response characteristic which is associated with vanishing of a helical structure which is a characteristic of chiral smectic C phase, and is an electro-optical effect which is named helical strain change mode.

Response time was approximately 100 m sec when applying 100 volts.

It was recognized that the response time became slower with decreasing temperature in the ferroelectric phase.

[EXAMPLE 3]

A liquid crystal device which is almost the same as the Example 1 except the electrode distance is 0.3 mm, was manufactured by spin-coating method.

Measurements of change of transmission of He—Ne laser light of 6,328 Å wave length according to applied voltage were carried out in this device which was placed between two polarizers perpendicularly oriented to each other.

Figure 7:
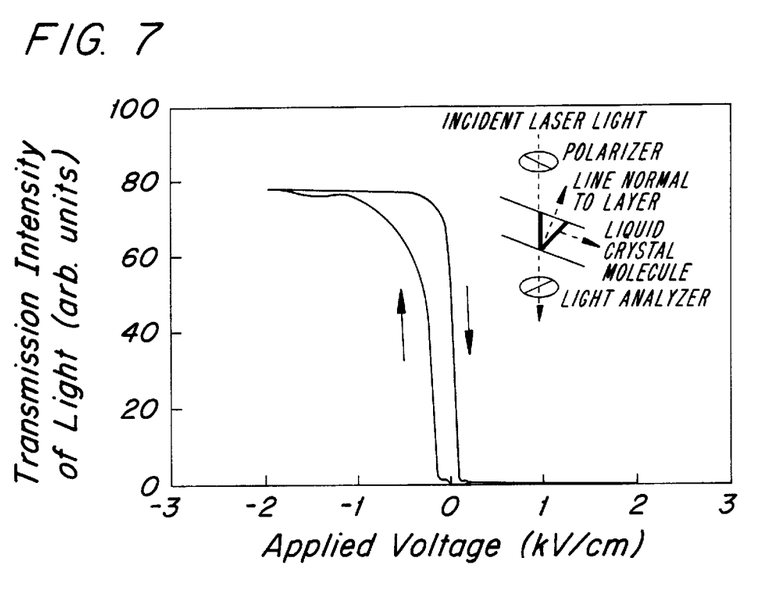
FIG. 7 is a hysteresis curve of the characteristic curve shown in FIG. 6.

In this case, the device was inclined approximately 20 to the incident laser light as shown in the inserted illustration in FIG. 7. In this system, transmission intensity of light was changed at 101° C. as shown in FIG. 7, corresponding to the voltage between the electrodes.

In the state, a helical structure is vanished by applying an electric field, and liquid crystal molecules are tilted a certain angle to the layer, the said phenomenon is an electro-optical effect resulting from a change in birefringence condition which is occurring due to reversing orientation of this tilt, in accompany with the polarity of the electric field.

[EXAMPLE 4]

A liquid crystal device having homeotropic orientation and provided with an electrode distance which is the same as in the Example 1 was manufactured by the spin-coating method of which the condition was changed to 5 sec at 250 rpm initially, and then for 20 sec at 3,500 rpm.

Measurements of transmission intensity change of light were carried out in this device which is placed between two polarizers perpendicularly oriented to each other. Transmission intensity of light was zero at zero volts in the smectic A phase, but increased with increasing voltage.

This is a phenomenon that tilt of liquid crystal molecules is occurring, and this is the so called electro-clinic effect resulting in tilt induced by electric field.

When observation of its response time by applying pulse voltage was carried out, a high speed response below several milliseconds was obtained.

Figure 8:
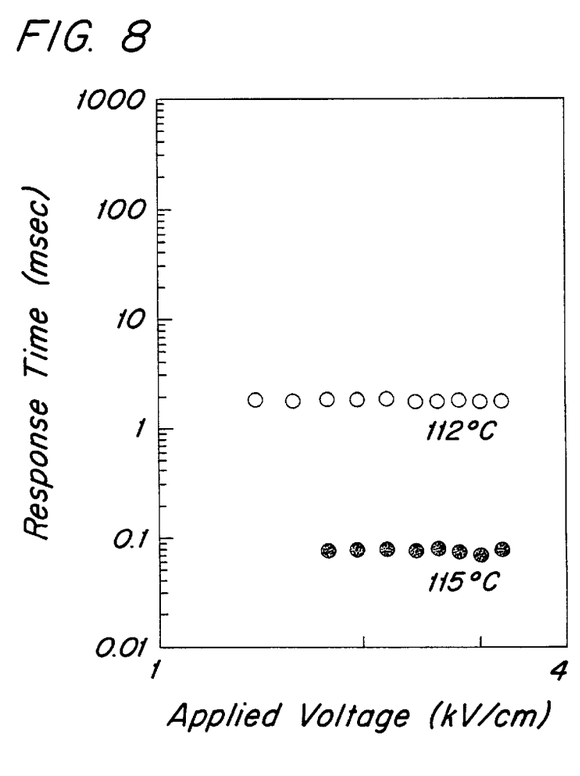
FIG. 8 is a graph showing the relationship between temperature and applied voltage/response time characteristic shown in FIG. 7.

FIG. 8 is a graph showing applied field dependence of the response time.

Figure 9:
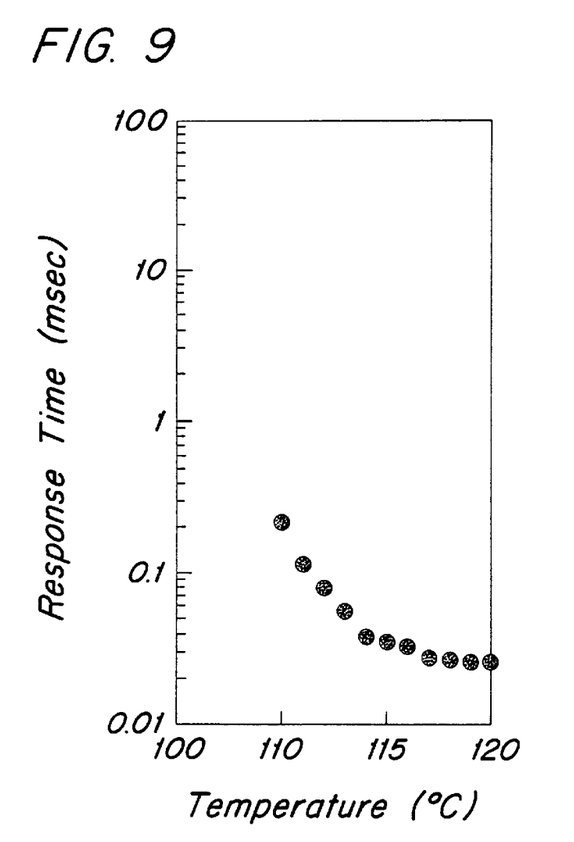
FIG. 9 is a graph showing a temperature characteristic of response time shown in FIG. 8.

As shown in FIG. 9, response time became shorter rapidly with increasing temperatures, and came up to high speed response of the order of microseconds.

[EXAMPLE 5]

A device comprising a liquid crystal layer on a glass plate made by spin-coating like in Example 1 and another glass plate loaded thereon, i.e. having the layer sandwiched between the said two glass plates, was manufactured. In this device, TS mode electro-optical effect as quite the same effect as mentioned above was observed at 95° C. associated with inverting polarity of the electric field stepwise like in Example 1.

[EXAMPLE 6]

Manufacturing the same device as Example 1, light of a NdYAG laser of 1.06 μm of wavelength was impinged from the bottom surface of the device.

As a result, light of 0.53μ of wavelength which is the secondary harmonic wave, was obtained by applying a voltage in the ferroelectric phase below 100 ° C.

It was confirmed that the intensity of the second harmonic wave was dependent on the incident angle and polarizing angle of incident light, and phase matching was occurred.

This phenomenon could not be observed in the smectic A phase above 110° C.

[EXAMPLE 7]

A device was manufactured by a process comprising forming a polyvinyl alcohol membrane by spin-coating on a quartz substrate, depositing gold thereon leaving a slit gap of width 5 mm, providing with a pair of parallel electrodes, and further spin-coating high molecular liquid crystal thereon by the same way as Example 1.

After allowing light of a He—Ne laser to lead and transmit to 20 mm in the polyvinyl alcohol membrane by a prism coupler, light was led out from a secondary prism coupler and its intensity was observed.

Intense light was obtained at 90 ° C. when applying voltage of +80 V to the gold electrodes, while light was cut off when applying a voltage of −80 V.

This shows that the device operates as an optical waveguide switch due to the change of condition for total reflection at a boundary of the polyvinyl alcohol membrane and the high molecular liquid crystal membrane. The response time was approximately 10 m sec.

Response times of 20μ sec were obtained when the same experiment was carried out at 115° C.

This is caused by changing the condition of total reflection at the boundary due to the electro-clinic effect which is occurring in the high molecular liquid crystal.

Thus, this device can be used as an optical wave-guide device.

[EXAMPLE 8]

A liquid crystal membrane having high molecular liquid crystal which is orientated homeotropically was formed by inclining a glass plate at 20°, dropping the high molecular liquid crystal solution mentioned above which is used in the same manner in Example 1, from the upper side, down flowing and drying.

Further, high molecular liquid crystal device was formed by forming a transparent electrode layer consisting of Indium-Tin-Oxide on the glass plate by means of the same manner as in the Example 1, then obtaining a nesa glass as a substrate having a pair of electrodes which is obtained by removing the said transparent electrode layer like a slit of width 0.5 mm and length 4 cm by etching, dropping the high molecular liquid crystal solution mentioned above on the substrate which is inclined at 30°, and drying during flowing downwardly to obtain the coating.

Measurement of transmission characteristic of the layer by impinging light of He—Ne laser of 6,328 Å of wavelength perpendicular to this liquid crystal layer was carried out.

Transient light scattering (TS) mode electro-optical effect was confirmed in a chiral smectic A phase below 110° C. associated with applying pulses of polarity reversed between positive and negative in the same way as in Example 1.

It was known that response time of this device became slower by 10% compared with the device of Example 1.

Figure 10:
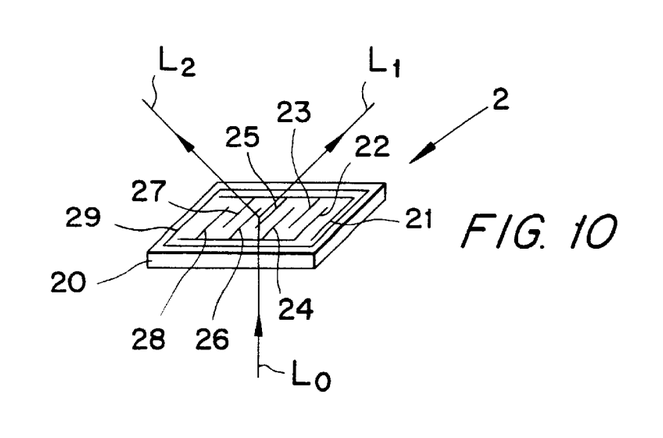
FIG. 10 is an illustrating view showing a configuration of high molecular liquid crystal device which operates as a phase diffraction grating.
Figure 11:
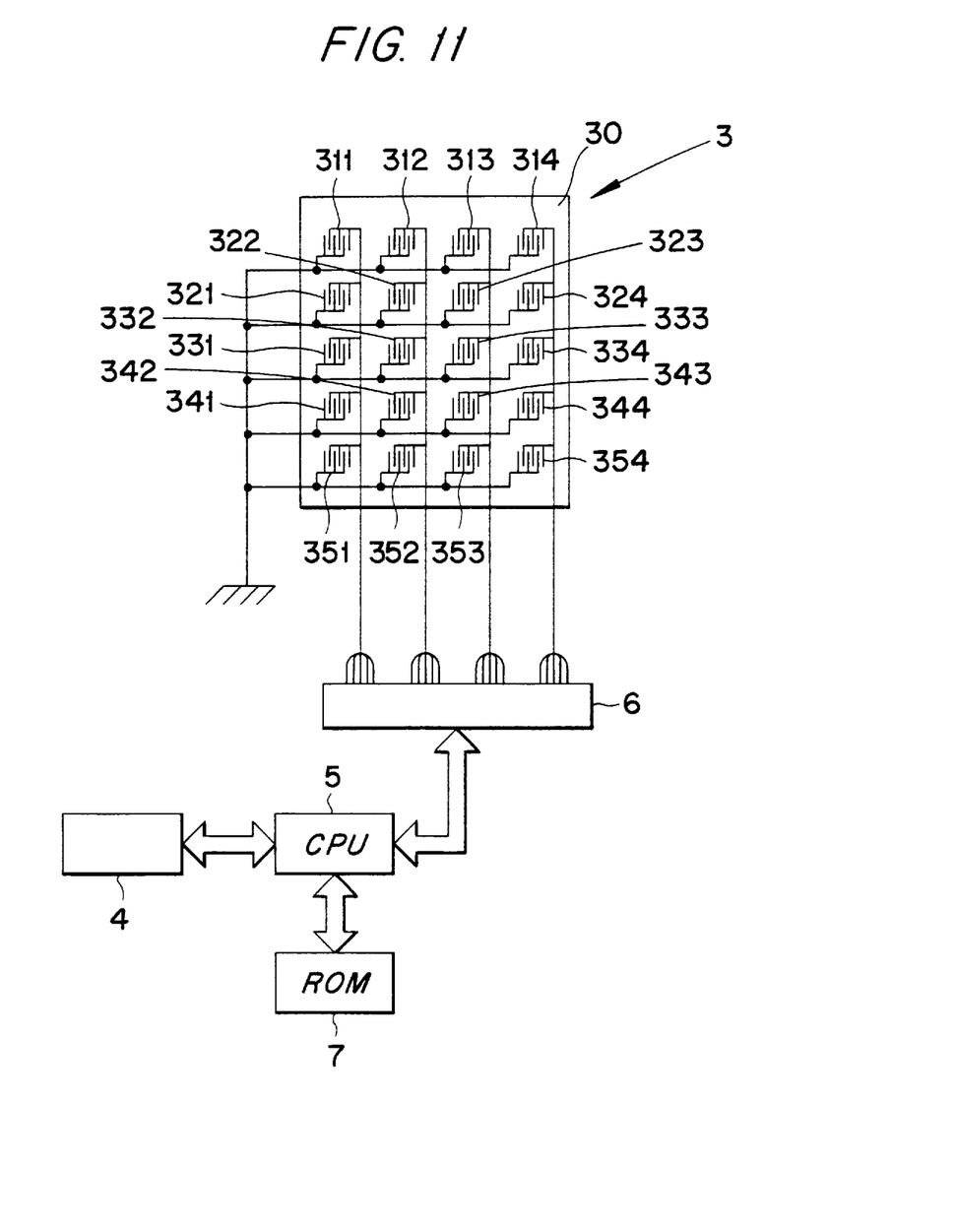
FIG. 11 is an illustrating view showing a configuration of a display device in which polymer phase diffraction gratings are used as pixels such as shown in FIG. 10.

An explanation of FIGS. 10 and 11 is as follows;

FIG. 10 is a perspective view showing a configuration of the high molecular liquid crystal device which is composed so as to operate as a phase diffraction grating. In the Fig.10, 2 is the high molecular liquid crystal device formed by composing a lot of pair of parallel electrodes 21, 22, 23, 24, 25, 26, 27 and 28 and a circuit which are connected so as to dispose those parallel electrodes in a manner to bring positive and negative poles alternately are composed on a surface of a quartz glass 20, and further, providing the high molecular liquid crystal membrane 29 thereon.

Intervals of those parallel electrodes 21, 22, 23, 24, 25, 26, 27, and 28 are selected appropriately depending on material of liquidcrystal used and wavelength of light.

For example, a polymeric phase diffraction grating is obtained by a method comprising of setting an interval of the parallel electrodes of 20 μm and length 200 μm, and evaporating solvent to form the high molecular liquid crystal layer 29 in which molecules are homeotropically oriented, while spin-coating the high molecular liquid crystal solution in the same way as in Example 1.

It was confirmed that the direction of light was changed between $L_1$ and $L_2$ with applied voltage in the smectic A phase at 110° C., as shown in the Figure, when measurement of the angle of diffraction of transmitted light by impinging light $L_0$ of He—Ne laser of 6,328 Å wavelength perpendicular to the back surface of this quartz glass 20, while changing applied voltage between pairs of the parallel electrodes was carried out.

This device is, that is, a polymeric phase diffraction grating, and this device can be utilized as a pixel for various kind of display screens, because of its capacity of regulating the direction of light by a change of applied voltage.

FIG. 11 is a describing illustration showing a configuration of a display apparatus using a plurality of the liquid crystal devices shown in FIG. 10, and in this figure, 3 is a display screen consisting of a plurality of the polymeric phase diffraction gratings 311, 312, 313, 314, 321, 322, 323, 324, 331, 332, 333, 334, 341, 342, 343, 344, 351, 352, 353 and 354 disposed mosaically on a large-sized glass substrate 30, 4 is an input unit, 5 is cpu, 6 is buffer, and 7 is ROM storing character-pattern or the like to be displayed.

Still more, in this figure, in order to simplify the illustration, the liquid crystal film and insulation layer which is formed between a transmission line and earth line or the like are omitted in the drawing.

Although only 20 polymeric phase diffraction gratings are shown in this figure, it will be readily understood that numbers from 0 to 9 and English characters of considerable number can be indicated with only this.

Actually, a lot of pixels are disposed on the screen correspondent to a use, thereby a picture of extremely high quality can be provided. Moreover, this device is means for regulating a diffraction angle of transmitted light, thereby allowing transmitted light respectively from a different group of pixels according to viewing angle incident upon eyes of a viewer is possible. Accordingly, for example, it is possible to utilize in a hologram which can express an animation and flat display capable to recognize three-dimensional pictures by the naked eye.

Moreover, the size of one pixel can be selected appropriately depending on screen size and distance from a viewer, even above a square of several centimeter or below a square of several micro-meters.

The high molecular liquid crystal device can be provided at a low cost and in a large quantities by a very simple method according to the invention, as the invention can be constituted as mentioned above.

Still more, the configurations of the invention is not limited to the example as mentioned above and especially, kind of a solvent, a concentration of a solution and a viscosity upon manufacturing liquid crystal material and the solution, and means for applying a solution uniformly and means for evaporating the solution, and material and shapes of a substrate and electrode, and methods for covering to protect a high molecular liquid crystal membrane, systems for coupling with an outer power supply and an outer circuit or the like can be selected or modified at will, and this invention subsumes all of these modifications.

APPLICABILITY IN THE INDUSTRY

As mention above, a liquid crystal device according to the present invention can be provided over an extremely minute to considerably large-sized area, and utilized widely for various kinds of photo-electrical conversion, electric-photo conversion, light control and display or the like.

The invention claimed is:

1. A method of manufacturing high molecular liquid crystal device, characterized by that a high molecular liquid crystal layer which functions as an active layer of the device is formed by applying a high molecular liquid crystal solution directly on a substrate, and evaporating the solvent.

2. A method of manufacturing a high molecular liquid crystal device according to claim 1 wherein the high molecular liquid crystal solution layer is applied by spin-coating.

3. A method of manufacturing high molecular liquid crystal device according to claim 1 wherein applying high molecular liquid crystal solution layer is formed by down-flowing.

4. A method of manufacturing a high molecular liquid crystal device according to claim 1 wherein a high molecular liquid crystal solution layer is formed by printing a desired pattern on a surface of the substrate by screen printing process and evaporating the solvent.

5. High molecular liquid crystal device which is made by method according to claim 1.

6. High molecular liquid crystal devices according to claim 5 wherein the high molecular liquid crystal is a side-chain type high molecular liquid crystal.

7. A high molecular liquid crystal device according to claim 5 wherein the high molecular liquid crystal is main chain type high molecular liquid crystal.

8. A high molecular liquid crystal device according to claim 5 wherein the high molecular liquid crystal is a chiral smectic liquid crystal having asymmetric carbons.

9. A high molecular liquid crystal device according to claim 5 wherein the high molecular liquid crystal is a nematic liquid crystal having asymmetric carbons.

10. A high molecular liquid crystal device according to claim 5 wherein the high molecular liquid crystal is a cholesteric liquid crystal having asymmetric carbons.

11. A high molecular liquid crystal device according to claim 5 wherein the high molecular liquid crystal is a ferroelectric liquid crystal.

12. A high molecular liquid crystal device according to claim 5 wherein the high molecular liquid crystal is an antiferroelectric liquid crystal.

13. A high molecular liquid crystal device according to claim 5 wherein the high molecular liquid crystal is a ferri-electric liquid crystal.

14. A high molecular liquid crystal device according to claim 5 wherein the liquid crystal molecules are oriented homeotropically.

15. A high molecular liquid crystal device according to claim 5 wherein the liquid crystal molecules are oriented homogeneously.

16. A high molecular liquid crystal device according to claim 5 wherein the device is an electro-optical effect device, and wherein said substrate further comprises at least one electrode adjacent to said high molecular liquid crystal layer.

17. A high molecular liquid crystal device according to claim 16, wherein said electro-optical effect device is a ferroelectric-switching device.

18. A high molecular liquid crystal device according to claim 17, wherein said ferroelectric-switching device includes a molecular chain which changes in orientation.

19. A high molecular liquid crystal device according to claim 17, wherein said ferroelectric-switching device includes a helical structure which changes under strain.

20. A high molecular liquid crystal device according to claim 16, wherein the electro-optical effect is of an electro-clinic effect type soft mode.

21. A high molecular liquid crystal device according to claim 16, wherein the electro-optical effect is of TSM (transient scattering mode) type.

22. A high molecular liquid crystal device according to claim 16 wherein the electro-optical effect is of TN (twisted-nematic) type.

23. A high molecular liquid crystal device according to claim 16 wherein the electro-optical effect is of STN (super twisted-nematic) type.

24. A high molecular liquid crystal device according to claim 16 wherein the electro-optical effect is of a type utilizing phase transition.

25. A high molecular liquid crystal device according to claim 5 wherein the device is an optical wave-guide type device.

26. A high molecular liquid crystal device according to claim 5 wherein the device is a non-linear optical device.

27. A high molecular liquid crystal device according to claim 5 wherein the device is a device utilizing a pyro-electric effect, and wherein said substrate further comprises at least one electrode adjacent to said high molecular liquid crystal layer.

28. A high molecular liquid crystal device according to claim 5 wherein the device is a device utilizing a piezo-electric effect, and wherein said substrate further comprises at least one electrode adjacent to said high molecular liquid crystal layer.

29. A high molecular liquid crystal device according to claim 5 wherein the device is a multi layer high molecular liquid crystal device.

30. A high molecular liquid crystal device according to claim 5 wherein the high molecular liquid crystal layer has a thickness between 0.5 $\mu$m and 1000 $\mu$m.

31. A high molecular liquid crystal device according to claim 5, manufactured by forming a multiplicity of parallel strip electrodes on a transparent substrate with the center distance between 5 μm and 300 μm, to provide pairs of parallel electrodes each pair comprising a positive and a negative pole; connecting each of the parallel electrodes alternately to positive and negative input terminals, and forming a high molecular liquid crystal layer thereon working as an active layer; and constructed to operate as a phase diffraction grating.

32. A display screen comprising pixels constituted by high molecular liquid crystal devices according to claim 5, and wherein said substrate of each of said high molecular liquid crystal devices further comprises at least one electrode adjacent to said high molecular liquid crystal layer.

\* \* \* \* \*

UNITED STATES PATENT AND TRADEMARK OFFICE
CERTIFICATE OF CORRECTION

PATENT NO. : 5,841,503

DATED : November 24, 1998

INVENTOR(S) : Katsumi Yoshino, et al

It is certified that error appears in the above-identified patent and that said Letters Patent is hereby corrected as shown below:

On the Title Page, Item [22] should read: --- May 15, 1996 ---.

After Item [22], the Title Page should read as follows:

[86] PCT No.: PCT/JP95/01948

§ 371 Date: May 15, 1996

§ 102(e) Date: May 15, 1996

[87] PCT Pub. No.: WO96/10209

PCT Pub Date: April 4, 1996

On the Title Page, Item [30] Foreign Application Priority Data, insert the following:
---- PCT/JP95/01948  WIPO  September 27, 1995 ----.

Signed and Sealed this

Fifteenth Day of February, 2000

*Attest:*

Q. TODD DICKINSON

*Attesting Officer*  *Commissioner of Patents and Trademarks*